April 16, 1968     C. F. ALBAN     3,378,357
TEMPERATURE COMPENSATED MAGNETIC FIELD RESPONSIVE MATERIAL
Filed Oct. 20, 1965     2 Sheets-Sheet 1

INVENTOR.
CLARENCE F. ALBAN
BY
Olsen and Stephenson
ATTORNEYS

INVENTOR
CLARENCE F. ALBAN

BY Olsen and Stephenson
ATTORNEYS

United States Patent Office 3,378,357
Patented Apr. 16, 1968

3,378,357
TEMPERATURE COMPENSATED MAGNETIC
FIELD RESPONSIVE MATERIAL
Clarence F. Alban, Detroit, Mich., assignor to W. M.
Chace Company, Detroit, Mich., a corporation of
Delaware
Filed Oct. 20, 1965, Ser. No. 498,485
9 Claims. (Cl. 29—183.5)

ABSTRACT OF THE DISCLOSURE

A laminated magnetic field responsive material consisting of two laminations formed of materials having substantially different coefficients of magnetostriction and a third temperature compensated lamination secured to one of the first two laminations. The third lamination is dimensionally proportioned relative to the first two so that changes in temperature of the ambient environment do not cause substantial lateral deflection of the material.

---

Magnetostriction is a well known physical phenomenon which produces a change in dimension of certain materials when exposed to a magnetic field. Many metals, such as nickel and nickel-iron alloys are magnetostrictive and each such metal has a known magnetostrictive coefficient, namely, the change in dimension per unit of size per unit of magnetization. Consequently, when a bimetal element is made from two materials having different magnetostrictive coefficients the element will flex a determinable amount when exposed to a magnetic field of predetermined strength. As a result, such elements are useful as remote controlled actuators, switches and the like in a variety of environments. However, since the component layers of magnetic field responsive elements generally have different coefficients of thermal expansion, such elements will also flex in response to temperature change which is usually undesirable. This temperature response of a such an element can cause undesirable actuation or operation, or lack of actuation or operation, of whatever mechanism is being controlled by the element. It is an object of this invention, therefore, to provide a laminated magnetic field responsive material having substantially zero deflection due to temperature changes.

A further object of this invention is to provide a temperature compensated magnetic field responsive material which is constructed so as to achieve substantially maximum magnetoflexivity or lateral deflection in response to exposure to a magnetic field.

The composite material of this invention consists of three or more component layers of different materials which are intimately secured together along their contiguous surfaces so that a change in length of one layer causes bending or lateral deflection of elements formed from such composite material. The laminations are preferably secured together by diffusion welding or bonding in the solid state by either a hot or cold process. The materials from which the layers are formed and the dimensional proportions of the layers are pre-selected in accordance with a formula hereinafter set forth so that a change in ambient temperature does not cause any deflection of this element. Such a change in temperature causes changes in the lengths of the component layers, which are generally formed of different materials. This length change in each layer, due to temperature change, cannot be avoided, but because of the relative temperature response characteristics of the layers, such a length change does not cause any bending or deflection of the element. The bending or deflection of the element of this invention is obtained by exposure of the element to a magnetic field, and the layers are selected and proportioned thicknesswise so that this deflection, for magnetic field of given strength, is substantially a maximum.

The laminated material of this invention includes two layers or laminations having relatively different magnetostrictive coefficients so that when the material is subjected to a magnetic field, these two laminations will change in length different amounts thereby producing the desired bending or deflection of the material. In one embodiment of the invention, one of these layers has a high negative magnetostrictive coefficient, and the other has a high positive magnetostrictive coefficient. These two layers provide for flexing of the element when exposed to a magnetic field and a third layer is added to provide temperature compensation. The third layer can be disposed on either side of the first two, depending on the coefficients of thermal expansion of the materials from which the three layers are formed. In addition, the material selected for the third layer can be one having a magnetostrictive coefficient such that when combined with the first two layers it will have a desirable effect on the deflection of the first two layers in the presence of a magnetic field. The material selected for the third, or temperature compensating layer, can also be one having an insignificant magnetostrictive coefficient, in which case it is generally advantageous to employ a material having a very high or very low coefficient of thermal expansion in order that the third layer can be very thin and thereby have a minimum impeding effect on magnetoflexure of the laminated material. The component materials are selected and proportioned as to thickness as functions of the elastic moduli, thermal coefficients of expansion and magnetostrictive coefficients of the materials so that the resulting composite material exhibits substantially zero deflection due to temperature change over the range of temperatures for which flexure elements formed from the material are to be used, at the same time achieving maximum magnetoflexivity, or lateral deflection, in response to an external magnetic field.

Further objects, features and advantages of this invention will become apparent from a consideration of the following description, the appended claims, and the accompanying drawing in which:

FIGURE 1 is a perspective view of one embodiment of the laminated element of this invention;

FIGURE 2 is a diagrammatic view illustrating the increased length of each of the laminations in the element of this invention caused by any combination of temperature change in the ambient environment and change in magnetic field environment, the laminations being shown separated only because a momentary consideration of the laminations in this condition facilitates synthesizing of the equation which enables prediction of element response to temperature changes;

Figure 1:
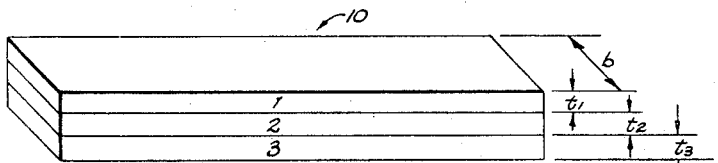

With reference to the drawing, the laminated element of this invention, indicated generally at 10, is illustrated in FIG. 1 as consisting of three laminations or layers 1, 2 and 3 of material, such as metal, explained more in detail hereinafter. The layers 1, 2 and 3 are arranged in a sandwich form and contiguous surfaces of adjacent layers are intimately secured together throughout their extent by any suitable means such as by hot or cold bonding, welding or by an adhesive. The relative dimensions of the layers to accomplish temperature compensation as described above is as follows:

Assume that all layers have the same width $b$ and length $L$. Each layer is characterized by the following three properties of significance:

$E$=modulus of elasticity, pounds per square inch.

$\alpha$=coefficient of linear thermal expansion, inches expansion per inch per degree F.

$\beta$=magnetostrictive coefficient of linear expansion, inches expansion per inch for one percent change in strength of magnetic field.

Figure 2:
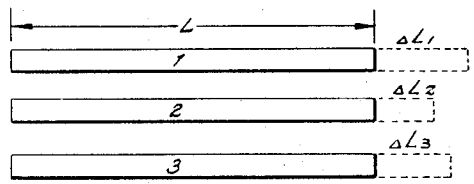

Assume for the moment that the laminations 1, 2 and 3 are independent of each other as shown diagrammatically in FIG. 2. Further assume that after a change in temperature $\Delta T$ and a change in magnetic field strength $\Delta M$, the layers have changed in length as shown in broken lines at $\Delta L_1$, $\Delta L_2$ and $\Delta L_3$ in FIG. 2. These changes can be computed as follows:

$$\Delta L_1 = L(\alpha_1 \Delta T + \beta_1 \Delta M)$$
$$\Delta L_2 = L(\alpha_2 \Delta T + \beta_2 \Delta M)$$
$$\Delta L_3 = L(\alpha_3 \Delta T + \beta_3 \Delta M)$$

where the numeral subscript in each case denotes the property of the layer identified by the corresponding numeral.

Since the laminations 1, 2 and 3 are secured along their contiguous surfaces, axial forces $P_1$, $P_2$ and $P_3$ (FIG. 3) have been generated by $\Delta T$ and $\Delta M$. The forces $P_1$, $P_2$ and $P_3$ maintain the layers at the same, but a greater length $L_x$ than originally. Also, the algebraic sum of forces $P_1$, $P_2$ and $P_3$ must be zero since the element 10 is in equilibrium. Therefore:

$$P_1 - P_2 + P_3 = 0$$

However, these forces do cause curving of the element 10 since the bending moment about a given plane, for example the centroidal axis of layer 1, is not zero. Assuming a concave upward curving of element 10 as positive, this moment can be expressed as:

$$M = P_2\left(\frac{t_1}{2} + \frac{t_2}{2}\right) - P_3\left(\frac{t_1}{2} + t_2 + \frac{t_3}{2}\right)$$

Since element 10 is in equilibrium, the sum of internal resisting moments $M_1$, $M_2$ and $M_3$ in layers 1, 2 and 3 is equal to the external moment $M$.

Thus:
$$M = M_1 + M_2 + M_3$$

Figure 5:
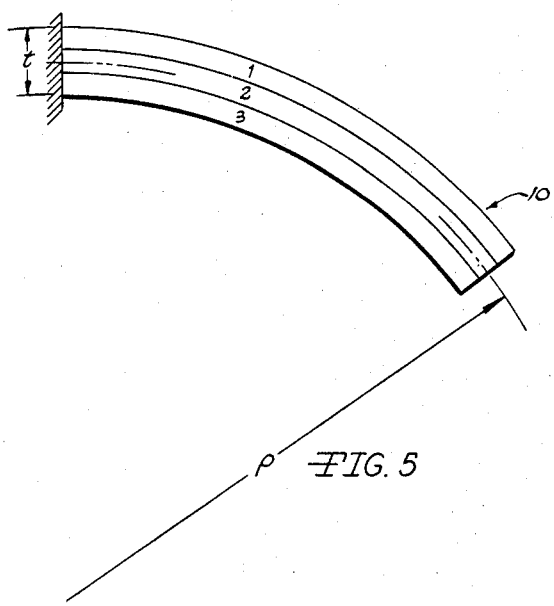
FIGURE 5 is a diagrammatic view showing the change in curvature of the element of this invention produced by exposure of the element to a magnetic field.

For the small deflections involved in element 10, the radius of curvature $\rho$ is very large with respect to element thickness $t$ (FIG. 5). Therefore, the radius or curvature $\rho$ for each layer can be assumed to be the same. As a result:

$$M_1 = \frac{E_1 I_1}{\rho}; \quad M_2 = \frac{E_2 I_2}{\rho}; \quad M_3 = \frac{E_3 I_3}{\rho}$$

where $I$=moment of inertia of a layer about its own centroidal axis. Thus:

$$\frac{1}{\rho}(EI) = M$$

$$\frac{1}{\rho}(E_1 I_1 + E_2 I_2 + E_3 I_3) = P_2\left(\frac{t_1}{2} + \frac{t_2}{2}\right) - P_3\left(\frac{t_1}{2} + t_2 + \frac{t_3}{2}\right) \quad (1)$$

The adjacent fibers at the interface between adjacent layers must undergo the same deformation. Each fiber expands or contracts a distance determined by the algebraic sum of the following four expansion or contraction effects:

(1) Thermal $-\alpha_i \Delta T$.
(2) Magnetostrictive expansion $-\beta_i \Delta M$.
(3) The force $$P_i - \frac{P_1}{E_i b t_i}$$

(4) The strain as a result of bending $-\epsilon_i$, where the subscript $i$ denotes any layer.

Thus:

$$\alpha_1 \Delta T + \beta_1 \Delta M - \frac{P_1}{E_1 b t_1} + \epsilon_1 = \alpha_2 \Delta T + \beta_2 \Delta M + \frac{P_2}{E_2 b t_2} - \epsilon_2 \quad (2)$$

$$\alpha_2 \Delta T + \beta_2 \Delta M + \frac{P_2}{E_2 b t_2} + \epsilon_2 = \alpha_3 \Delta T + \beta_3 \Delta M - \frac{P_3}{E_3 b t_3} - \epsilon_3 \quad (3)$$

Figure 6:
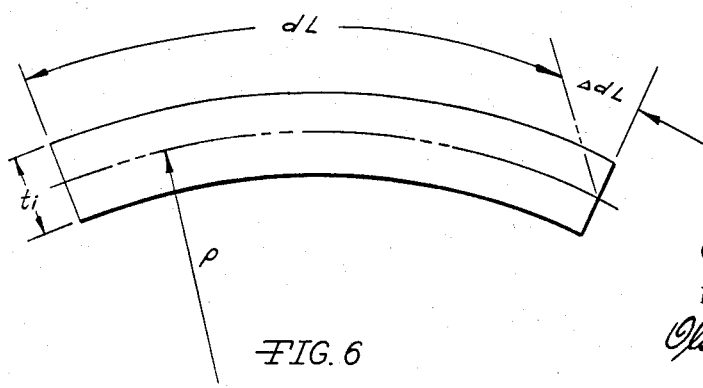
FIGURE 6 is a diagrammatic view similar to FIG. 5 illustrating the change in curvature of a single lamination in the element of this invention produced by subjection to the element to a magnetic field.
Figure 8:
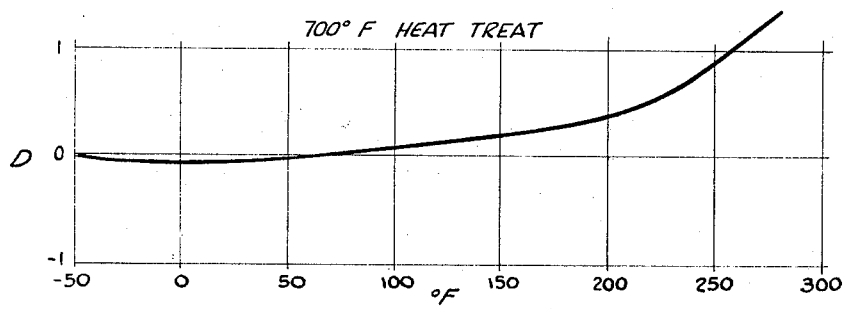
FIGURES 8-11 are graphs illustrating the effect of heat treat temperature on temperature compensation.
Figure 9:
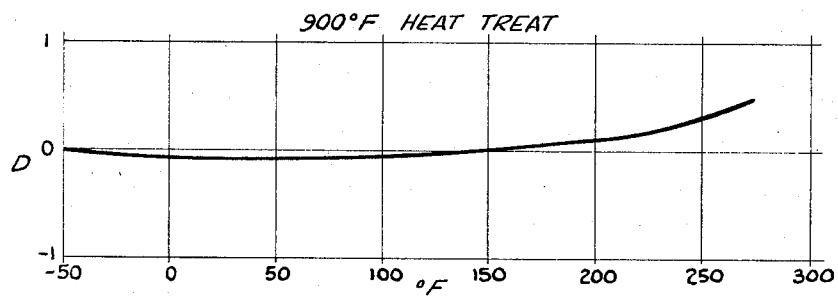
Figure 10:
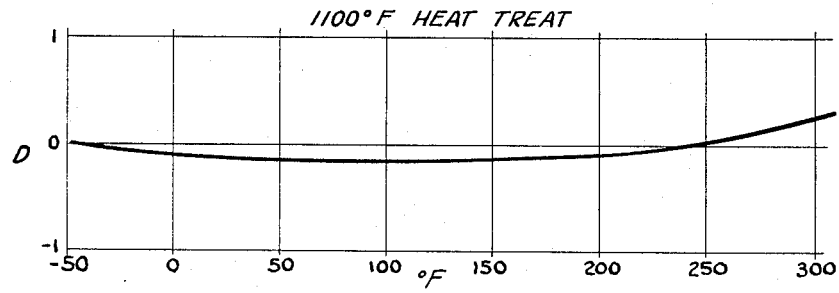
Figure 11:
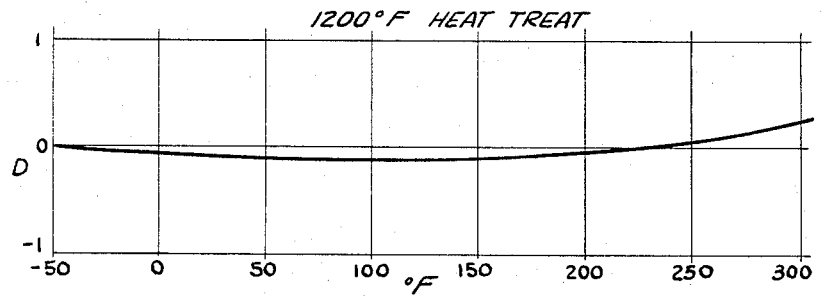

As shown in FIG. 6, and assuming curvature of element 10 is small, comparing similar triangles:

$$\frac{\Delta dL}{t_{i/2}} = \frac{dL}{\rho} \text{ or } \frac{\Delta dL}{dL} = \frac{t_{i/2}}{\rho}$$

Also:

$$\frac{\Delta dL}{dL} = \epsilon_i$$

Thus:

$$\epsilon_i = \frac{t_{i/2}}{\rho} \quad (4)$$

Substituting Equation 3 into Equations 1 and 2 and converting to the following dimensionless expressions:

$$t_1/t = A \quad t_2/t = B \quad t_3/t = C$$
$$E_1/E_2 = D \quad E_2/E_2 = 1 \quad E_3/E_2 = G$$

and solving for $1/\rho$ in Equation 1, the following expression is obtained:

$$\frac{1}{\rho} = \frac{6\{[\Delta T(\alpha_2 - \alpha_1) + \Delta M(\beta_2 - \beta_1)]Q + [\Delta T(\alpha_3 - \alpha_2) + \Delta M(\beta_3 - \beta_2)R]\}}{t[Z + 3(A+B)Q + 3(1-A)R]} \quad (5)$$

where $$Q = DA[B(A+B) + GC(B+1)]$$
$$R = GC[B(1-A) + DA(B+1)]$$
$$Z = (DA^3 + B^3 + GC^3)(DA + B + GC)$$

Equation 5 is the general expression for the change in curvature of any three layered element in which one or more of the component layers is subject to dimensional changes as a result of both temperature and magnetic field changes. In the present invention, for no change in magnetic field ($\Delta M = 0$) the change in curvature must be zero, irrespective of temperature change.

Thus introducing $\Delta M = 0$ into Equation 5 and setting the result equal to zero, $$\frac{Q}{R} = -\left(\frac{\alpha_3 - \alpha_2}{\alpha_2 - \alpha_1}\right) \quad (6)$$

The expression for change in curvature in this case then becomes:

$$\frac{1}{\rho} = \frac{6R\Delta M}{t}\left[\frac{(\beta_3 - \beta_2) - (\beta_2 - \beta_1)\left(\frac{\alpha_3 - \alpha_2}{\alpha_2 - \alpha_1}\right)}{Z + 3R\left[1 - A - (A+B)\left(\frac{\alpha_3 - \alpha_2}{\alpha_2 - \alpha_1}\right)\right]}\right] \quad (7)$$

Equation 7 is thus the general expression for the change in curvature of any three-layered element 10 in which the proportions and properties of the element have been selected to satisfy Equation 6 to insure complete insensitivity to temperature changes.

In the present invention the fractional thicknesses A, B and C of the layers 1, 2 and 3 are proportioned to obtain maximum response to the presence of a magnetic field while remaining unaffected by temperature changes. This proportioning is accomplished as follows:

Since $C=1-(A+B)$, the functions Q and R can be expressed in terms of A and B only. Solving then for A in terms of B it is found that:

$$A = \frac{-S \pm \sqrt{T-4U}}{V} \qquad (8)$$

in which:

$$S = DB^2 + DG(1-B^2)\left(1+\frac{\alpha_3-\alpha_2}{\alpha_2-\alpha_1}\right) + (GB^2-2GB)\left(\frac{\alpha_3-\alpha_2}{\alpha_2-\alpha_1}\right)$$

$$T = \left[DB^2 + DG(1-B^2)\left(1+\frac{\alpha_3-\alpha_2}{\alpha_2-\alpha_1}\right) + (GB^2-2GB)\left(\frac{\alpha_3-\alpha_2}{\alpha_2-\alpha_1}\right)\right]^2$$

$$U = \left[DB - DG(B+1)\left(1+\frac{\alpha_3-\alpha_2}{\alpha_2-\alpha_1}\right) + GB\left(\frac{\alpha_3-2\alpha}{\alpha_2-1\alpha}\right)\right]\left[GB(1-B)\left(\frac{\alpha_3-\alpha_2}{\alpha_2-\alpha_1}\right)\right]$$

$$V = 2\left[DB - DG(B+1)\left(1+\frac{\alpha_3-\alpha_2}{\alpha_2-\alpha_1}\right) + GB\left(\frac{\alpha_3-\alpha_2}{\alpha_2-\alpha_1}\right)\right]$$

Equation 8 allows the determination of the fractional thickness A, and thus C, once the properties of the three layers are specified and a value of B is selected. In order to select B so as to yield maximum sensitivity of element 10 to a magnetic field, C is first eliminated from R and Z in Equation 7 by replacing it with $[1-(A+B)]$. Equation 8 is then substituted into the result to eliminate A, leaving an expression for the change in curvature as a function of only B and the properties of the component materials.

Symbolically such an equation appears as:

$$1/\rho = f(B, D, G, \alpha_1, \alpha_2, \alpha_3, \beta_1, \beta_2, \beta_3) \qquad (9)$$

where "$f$" means "a function of."

Equation 9 can be differentiated with respect to B and the result set equal to zero to solve for B*, which is the value of B providing for maximum sensitivity of element 10 to change in magnetic field.

Figure 7:
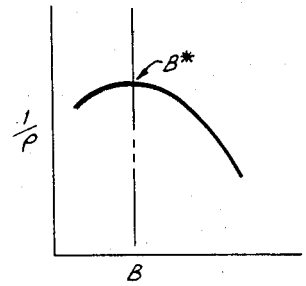
FIGURE 7 is an illustration of a graph which is plotted to obtain particular conditions in the element of this invention.

This differentiation produces an equation which cannot be solved explicity for B*. It is necessary, therefore, to solve numerically by substituting specific values for the properties of the materials in Equation 9, then successively substitute values of B and solve for the corresponding changes in curvature $1/\rho$. The numerical results are plotted as in FIG. 7 to determine the value of B giving the greatest curvature. This plotting is repeated for other combinations of materials or of ranges of material properties considered suitable.

Figure 3:
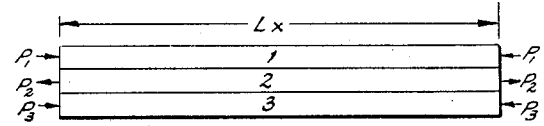
FIGURE 3 is a diagrammatic view illustrating the increased length of the laminated element of this invention caused by the condition illustrated in FIG. 2, with the laminations secured so that the element acts as an integral whole.
Figure 4:
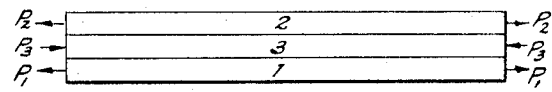
FIGURE 4 is a diagrammatic view, like FIG. 3, of another embodiment of the laminated element of this invention.

In the illustrated embodiments of the invention, the layers 2 and 3 are magnetostrictive, the materials selected for these layers are ones having relatively different magnetostrictive coefficients, and the layer 1 is the temperature compensating layer. The location of layer 1, i.e. against layer 2 or against layer 3, is determined by the coefficient of thermal expansion of the material selected for layer 1 and the relationship of this coefficient to the coefficients of thermal expansion of the layers 2 and 3. For example, if layer 2 has a low coefficient of thermal expansion relative to layer 3, a material having a high coefficient can be selected for layer 1 which is then positioned as shown in FIG. 3, namely, against layer 2. In the alternative, a material having a low coefficient of thermal expansion can be selected for layer 1, in which case layer 1 is positioned, as shown in FIG. 4, against layer 3. In the event layer 3 has a lower coefficient of thermal expansion than layer 2, a material having a low coefficient of thermal expansion is used for layer 1 in the FIG. 3 embodiment and a material having a high coefficient of thermal expansion is selected for layer 1 in the FIG. 4 embodiment.

It is desirable to also select a material for the temperature compensating layer 1 which has a magnetostrictive coefficient corresponding as close as possible to the magnetostrictive coefficient of the adjacent layer 2 (FIG. 3) or layer 3 (FIG. 4), since the layer 1 will then not reduce the flexivity of element 10 produced by a magnetic field. However, while such an arrangement is within the scope of this invention, presently available materials do not provide the choice of a temperature compensating layer 1 having the required coefficient of thermal expansion and also this desirable magnetostrictive coefficient. A material is therefore chosen for layer 1 having either a very high or very low coefficient of thermal expansion, depending on the location of layer 1 against layer 2 or layer 3 and the relative coefficients of thermal expansion of layers 2 and 3, so that layer 1 can be as thin as practicable and will therefore have a minimum effect on the magnetoflexivity of element 10. The material chosen for layer 1 will have a coefficient of thermal expansion higher or lower, as the case may be, than either layer 2 or 3 so that layer 1 can be thin. Representative materials for layer 1 (none of which hapepns to be significantly magnetostrictive) are the following alloys:

(a) 72 Mn, 18 Cu, 10 Ni
(b) 22 Ni, 3 Cr, 75 Fe
(c) 25 Ni, 8½ Cr, 66½ Fe
(d) 20 Ni, 6 Mn, 74 Fe

In general, the greater the difference between the magnetostrictive coefficients of the materials selected for layers 2 and 3, the greater the magnitude of the deflection of element 10 when subjected to a magnetic field of a given strength. The materials selected for layers 2 and 3 are preferably, therefore, selected so that one has a high positive magnetostrictive coefficient (increases in length in a magnetic field) and the other has a high negative magnetostrictive coefficient (decreases in length in a magnetic field).

Representative materials for layer 2 having high positive magnetostrictive coefficients are the following alloys:

(a) 35–65% Ni, balance Fe
(b) 70 Co, 30 Fe
(c) 12 Al, 88 Fe
(d) 49 Co, 49 Fe, 2 V
(e) 52 Co, 38 Fe, 10 V Representative materials for layer 3 having high negative magnetostrictive coefficients are as follows:

(a) Pure Ni
(b) 20 Co, 80 Ni
(c) 90 Co, 10 Ni

An important consideration affecting the performance of an element 10 is the temperature at which the laminated material from which it is formed is heat treated, in the event heat treatment is advisable for any reason. Consequently, the final heat treat temperature is considered in the selection and proportioning of the component layers 1, 2, and 3. This is illustrated in FIGS. 8–11 in which the relative deflection "D" for an element 10 is shown for a range of temperatures from −50° F. to about 300° F. for the various heat treat temperatures indicated for each graph. These graphs illustrate that the degree of temperature compensation for the element 10 is improved over certain ranges of operating temperatures by heat treating the element at a certain temperature.

In accordance with this invention, therefore, the relative thicknesses of the component materials selected for layers 1, 2 and 3 are uniquely determined by the combination of the requirements for ambient temperature compensation and maximum magnetoflexivity according to Equation 8.

As specific examples:

Example I

Layer 1 (FIG. 1) is a temperature compensating layer formed of an alloy consisting of substantially 22% nickel, 3% chromium and 75% iron and layer 1 constitutes about 4–14% of the total thickness of element 10 depending on the heat treating temperature and the range of temperatures over which temperature compensation is desired. This alloy has a high coefficient of thermal expansion and a magnetostrictive coefficient of practically zero.

Layer 2 is a nickel-iron alloy consisting of 35–65% Ni, balance iron and constitutes about 35–55% of the total thickness of element 10. This material has a high positive magnetostrictive coefficient and a higher coefficient of thermal expansion than layer 3 since the layers are arranged as in FIG. 3.

Layer 3 is pure nickel and is of a thickness to constitute about 35–55% of the total thickness of element 10.

The extent to which this Example I composite material is substantially fully temperature compensated is shown in FIGS. 8–11 after the material was heat treated for one hour in an argon atmosphere at the indicated temperatures. The curves shown in FIGS. 8–11 vary with variations in thickness proportions of layers 1, 2 and 3. Consequently, the heat treat temperature is selected along with the selected proportions to achieve the most nearly perfect temperature compensation over the range of temperatures in which the element 10 will operate. In the case of the material used to provide the data for the graphs in FIGS. 8–11, for example, in an operating range of −50° F. to 100° F., a heat treat temperature of 700° F. would be preferred, while a heat treat temperature of 1200° F. would be preferred in the event the operating range is 200–250° F.

Example II

Layer 1 (FIG. 1) is an alloy consisting of substantially 72% manganese, 18% copper and 10% nickel and constitutes about 2–12% of the total thickness of element 10 depending on the heat treating temperature and the range of temperatures over which temperature compensation is desired. This alloy has a high coefficient of thermal expansion and a magnetostrictive coefficient of practically zero.

Layer 2 is the same as in Example I and constitutes about 40–60% of the total thickness of element 10.

Layer 3 is the same as in Example I and constitutes about 35–55% of the total thickness of element 10.

In Example II, the layers are also arranged as shown in FIG. 1.

From the above description it is seen that this invention provides a temperature compensated magnetoflexural material which consists of the single unitary element 10. By virtue of the construction of element 10 in a single strip form, it is readily manufactured as a compact component suitable for substantially any installation requiring a magnetoflexural element.

By constructing element 10 to satisfy Equation 7, a preselected change in curvature for a given ΔM can be obtained, while maintaining the element unresponsive to temperature changes. In the event maximum sensitivity to a magnetic field of given strength is desired, numerical values are used in Equation 9 to plot a curve as in FIG. 7, from which the necessary dimensions for the layers 1, 2 and 3 are obtainable.

It will be understood that the temperature compensated magnetoflexural material which is herein disclosed and described is presented for purposes of explanation and illustration and is not intended to indicate limits of the invention, the scope of which is defined by the following claims.

The embodiments of the invention in which an exclusive property or privilege is claimed are defined as follows:

1. A laminated material responsive to an ambient magnetic field, said material comprising two laminations arranged in surface-to-surface contact and secured together so that the laminations act as an integral whole, said laminations being formed of materials having substantially different coefficients of magnetostriction so that in the presence of an ambient magnetic field said material will deflect laterally, and means for compensating for the lateral deflection of said laminations in response to a change in the ambient temperature, said last mentioned means comprising a third lamination formed of temperature responsive material and arranged in surface-to-surface contact with and secured to one of said two laminations so that the three laminations act as an integral whole, said third lamination and the other of said two laminations being dimensionally proportioned relative to each other and relative to said one lamination so that changes in temperature of the ambient environment do not cause substantial lateral deflection of said material.

2. The material according to claim 1 in which one of said two laminations has a negative magnetostrictive coefficient and the remaining one of said two laminations has a positive magnetostrictive coefficient.

3. The material according to claim 1 in which said third one of said laminations has a higher coefficient of thermal expansion than either of said two laminations, and is secured to the one of said two laminations having the lower coefficient of thermal expansion.

4. The material according to claim 1 in which said third one of said laminations has a lower coefficient of thermal expansion than either of said two laminations, and is secured to the one of said two laminations having the higher coefficient of thermal expansion.

5. The material according to claim 1 in which said laminations are dimensionally proportioned so as to maximize the lateral deflection of said material on exposure of said material to a magnetic field of given strength.

6. A laminated material according to claim 1 in which said third lamination is a metal alloy consisting essentially of 22% nickel, 3% chromium and 75% iron and constitutes 4–14% of the total thickness of said element, one of said remaining two laminations is formed of a metal alloy consisting essentially of nickel and iron in the range of 35–65% nickel and balance iron and constituting 35–55% of the total thickness of said element, and the remaining one of said two laminations consists essentially of pure nickel and constitutes 35–55% of the total thickness of said element, with said laminations being arranged so that said third and said last mentioned laminations comprise the outer laminations of said element.

7. A laminated material according to claim 1 in which said third lamination is a metal alloy consisting essentially of 72% manganese, 18% copper, and 10% nickel and constitutes 2–12% of the total thickness of said element, one of said two laminations is formed of a nickel-iron alloy consisting essentially of 35–65% nickel, balance iron and constituting 40–60% of the total thickness of said element, and the remaining one of said two laminations consists essentially of nickel and constitutes 35–55% of the total thickness of said element, with said laminations being arranged so that said third and said last mentioned laminations comprise the outer laminations of said element.

8. A laminated material according to claim 1 wherein said three laminations are constructed of materials and have thicknesses proportioned substantially according to the following expression in which said third lamination is lamination 1 and said two laminations are laminations 2 and 3:

$$A = \frac{-S \pm \sqrt{T-4U}}{V}$$

where:

$A = t_1/t$ $$S = DB^2 + DG(1-B^2)\left(1+\frac{\alpha_3-\alpha_2}{\alpha_2-\alpha_1}\right) + (GB^2-2GB)\left(\frac{\alpha_3-\alpha_2}{\alpha_2-\alpha_1}\right)$$

$$T = \left[DB^2+DG(1-B^2)\left(1+\frac{\alpha_3-\alpha_2}{\alpha_2-\alpha_1}\right) + (GB^2-2GB)\left(\frac{\alpha_3-\alpha_2}{\alpha_2-\alpha_1}\right)\right]^2$$

$$U = \left[DB-DG(B+1)\left(1+\frac{\alpha_3-\alpha_2}{\alpha_2-\alpha_1}\right) + GB\left(\frac{\alpha_3-\alpha_2}{\alpha_2-\alpha_1}\right)\right]\left[GB(1-B)\left(\frac{\alpha_3-\alpha_2}{\alpha_2-\alpha_1}\right)\right]$$

$$V = 2\left[DB-DG(B+1)\left(1+\frac{\alpha_3-\alpha_2}{\alpha_2-\alpha_1}\right) + GB\left(\frac{\alpha_3-\alpha_2}{\alpha_2-\alpha_1}\right)\right]$$

$t$ = total thickness of said material
$\alpha$ = coefficient of linear thermal expansion
$B = t_2/t$
$D = E_1/E_2$
$E$ = modulus of elasticity
$G = E_3/E_2$; and
numerical subscripts refer to particular laminations, whereby a predetermined change in curvature of said material is obtained on exposure of said material to a magnetic field of predetermined strength without substantially any change in curvature of said material in response to changes in ambient temperature.

9. The laminated material of claim 8 wherein said thicknesses are also proportioned to satisfy the following expression and thereby obtain a maximum change in curvature of said material in response to exposure of said material to a predetermined change in magnetic field strength:

$$\frac{1}{\rho} = \frac{6R\Delta M}{t}\left[\frac{(\beta_3-\beta_2)-(\beta_2-\beta_1)\left(\frac{\alpha_3-\alpha_2}{\alpha_2-\alpha_1}\right)}{Z+3R\left[1-A-(A+B)\left(\frac{\alpha_3-\alpha_2}{\alpha_2-\alpha_1}\right)\right]}\right]$$

where:

$\rho$ = radius of curvature of said element
$R = GC[B(1-A)+DA(B+1)]$
$M$ = change in magnetic field
$\beta$ = magnetostrictive coefficient
$Z = (DA^3+B^3+GC^3)(DA+B+GC)$
$C = t_3/t$

References Cited
UNITED STATES PATENTS 2,474,682  6/1949  Liebowitz   29—195.5
3,077,285  2/1963  Budininkas   29—196.6
3,102,793  9/1963  Alban   29—195.5

HYLAND BIZOT, *Primary Examiner.*